Figure 1:
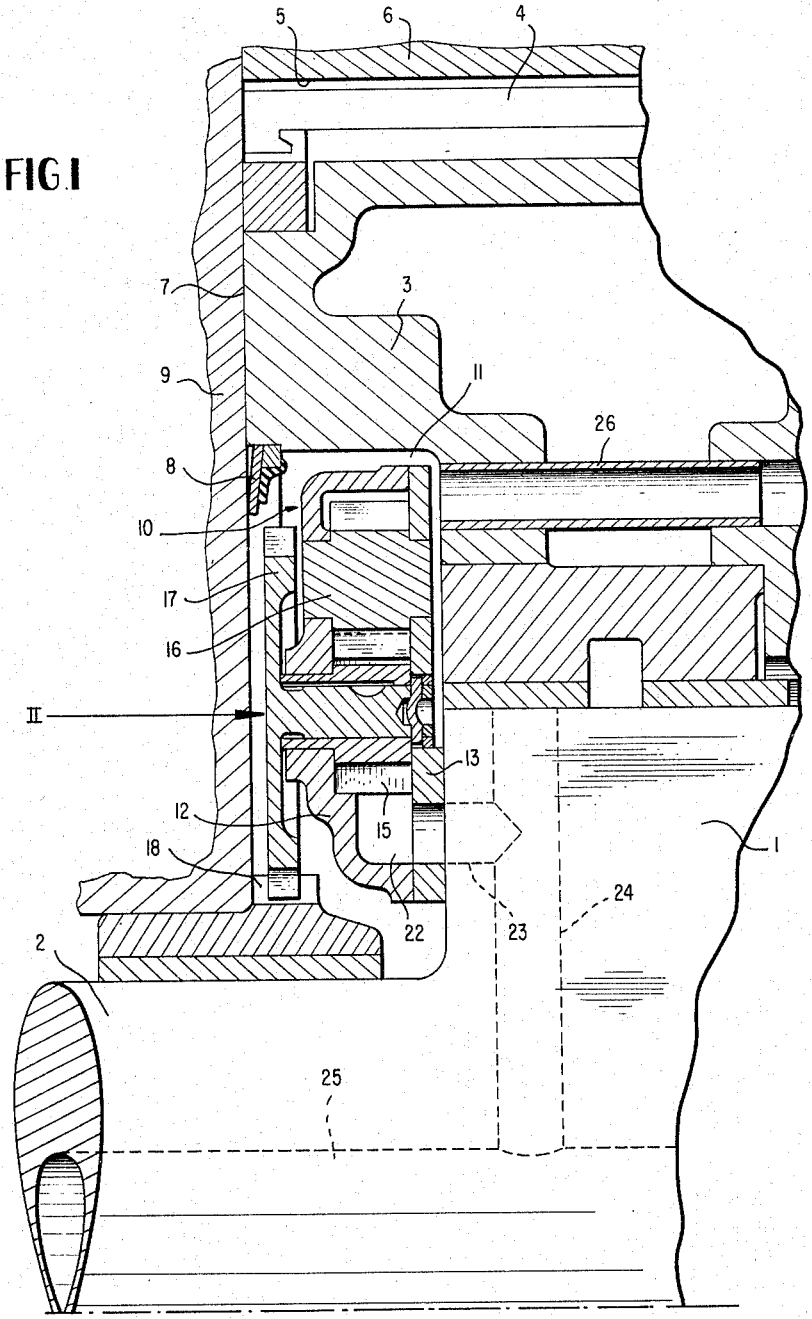

Aug. 2, 1966  J. GASSMANN  3,263,657
ROTARY PISTON ENGINE
Filed Dec. 19, 1963  2 Sheets-Sheet 1

INVENTOR.
JOHANNES GASSMANN
BY Dicke & Craig
ATTORNEYS

United States Patent Office 3,263,657
Patented August 2, 1966

3,263,657
ROTARY PISTON ENGINE
Johannes Gassmann, Altbach, Germany, assignor to Daimler-Benz Aktiengesellschaft, Stuttgart-Unterturkheim, Germany
Filed Dec. 19, 1963, Ser. No. 331,807
Claims priority, application Germany, Dec. 19, 1962, D 40,540
10 Claims. (Cl. 123—8)

The present invention relates to a rotary-piston internal combustion engine of trochoidal construction in which a polygonal piston is rotatably arranged on the eccentric of an eccentric shaft, which piston slides with the radial seals arranged at the corners thereof along the internal surfaces of a housing or enclosure and with the axial seals arranged at the end faces thereof and including oil seal rings, along the lateral housing parts.

The present invention is based on the aim to relieve the oil seal rings of the axial piston seal which, with engines of the type described, are subjected to high loads by the lubricating oil and possibly also by cooling oil. In solution of the underlying problem, the present invention essentially consists in that at least one side of the piston intermediate the piston end wall and the lateral housing part, an oil pump constructed as gear pump is rigidly arranged or secured on the end face of the eccentric, with the pump driven by a gear wheel, which in turn meshes with a gear wheel arranged concentrically to the eccentric shaft and fixedly arranged on the housing, whereby the pump sucks off or draws the oil out of the piston and/or out of the spaces between the piston end walls and the lateral housing parts within the area of the oil seal rings and forcibly discharges the oil or presses the same into a discharge bore provided within the eccentric and the eccentric shaft.

It is feasible by the arrangement of an oil pump according to the present invention to draw-off all of the accumulating lubricating oil and possibly also the cooling oil so that no oil sump remains within the piston which rotates with the speed of the eccentric shaft and which seeks to leak or seep radially outwardly between the oil seal rings and the lateral housing parts with a pressure dependent on the rotational speed of the eccentric shaft.

In order that the oil accumulating on both sides of the piston can be drawn-off with an arrangement of a single pump, there may be provided, according to a further feature and development of the present invention, several lines, for example, bores, conduits or pipe lines, extending in the axial direction through the piston in the proximity of the oil seal rings, which interconnect the space formed between the one piston end wall and the one lateral housing part with the spaced formed between the other piston end wall and the other lateral housing part. The lines, conduits or bores may thereby be arranged advantageously obliquely in the direction of rotation of the piston. Furthermore, in those constructions in which a transmission is provided for the control of the rotation of the piston which consists of a hollow or ring gear secured at the piston and of a pinion secured at the housing, the driving gear wheel of the oil pump may be constructed so as to engage or mesh with the pinion of the transmission for the control of the piston.

Accordingly, it is an object of the present invention to provide a rotary-piston internal combustion engine of trochoidal construction which effectively eliminates the shortcomings and drawbacks encountered with the prior art constructions, especially as regards high loads to which are subjected the oil seal rings thereof.

Another object of the present invention resides in the provision of a rotary-piston internal combustion engine of the type described hereinabove which is provided with a pump for relieving the oil seal rings from the high loads caused by the lubricating and/or cooling oil rotating in the manner of an oil sump at the rotational speed of the eccentric shaft.

Another object of the present invention resides in the provision of a rotary-piston internal combustion engine which draws the lubricating oil and/or cooling oil out of the piston interior and/or out of the spaces between the piston end walls and the lateral housing parts, is simple in construction, easy to install and together with its drive means thereof, does not increase the overall dimensions of the engine.

Another object of the present invention resides in the provision of a rotary-piston internal combustion engine provided with a pump for removing oil out of the spaces between the piston end walls and the lateral housing parts which is compact, reliable in operation and involves few extra driving parts.

A still further object of the present invention resides in the provision of a rotary-piston internal combustion engine in which a single pump may be utilized for effectively removing the oil from the spaces on both sides of the piston defined between a lateral housing wall and the piston end wall.

Figure 2:
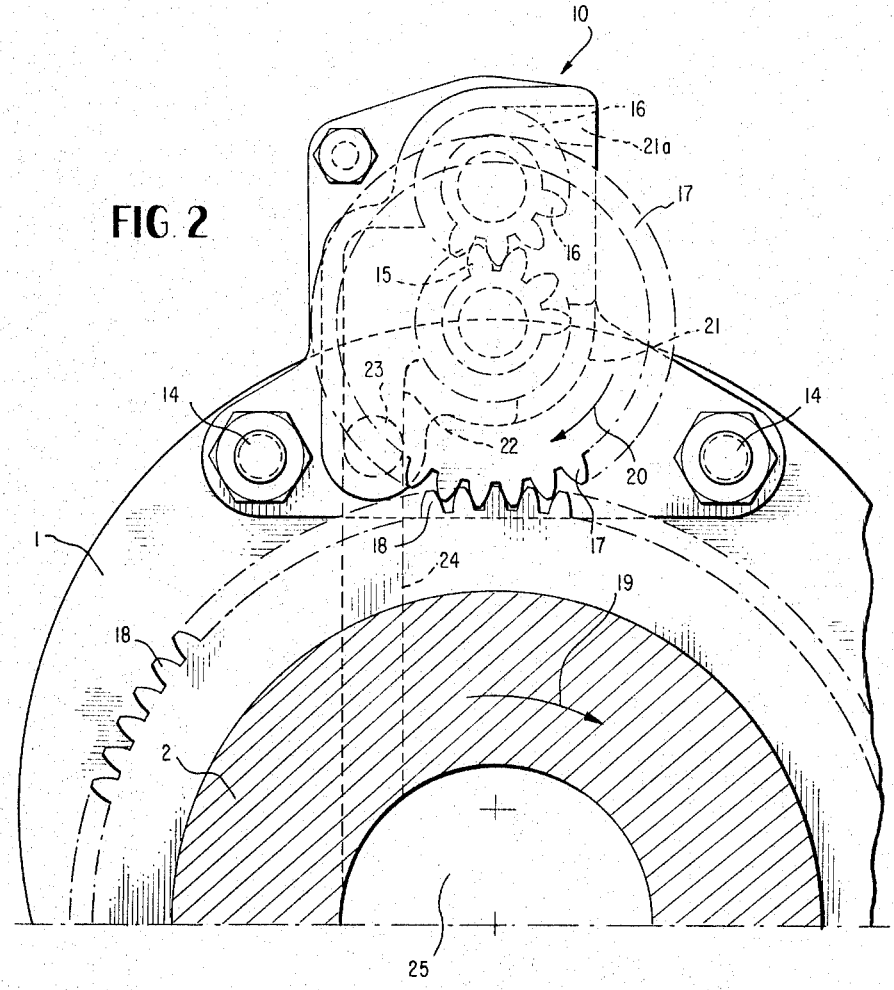

These and other objects, features and advantages of the present invention will become more obvious from the following description when taken in connection with the accompanying drawing which shows, for purposes of illustration only, one embodiment in accordance with the present invention, and wherein:

FIGURE 1 is a partial longitudinal cross-sectional view through a rotary-piston internal combustion engine of trochoidal construction provided with an oil pump secured at the eccentric in accordance with the present invention, and FIGURE 2 is a partial elevational view of the oil pump taken in a direction of arrow II in FIGURE 1.

Referring now to the drawing wherein like reference numerals are used throughout the various views to designate like parts, and more particularly to FIGURE 1, reference numeral 1 designates therein the eccentric of the eccentric shaft 2. The piston 3 is rotatably supported on the eccentric 1 and slides with the radial seals 4 thereof along the inner surfaces 5 of an engine housing 6 and on both sides with the axial seals thereof arranged at the piston end walls 7 which include oil seal rings 8 along the lateral housing parts 9. For purposes of relieving the oil said rings 8, an oil pump generally designated by reference numeral 10 and constructed as a gear pump is provided within the space 11 extending partly within the piston 3 and partly within the eccentric 1 on one side of the piston 3 between the piston end wall 7 and the lateral housing part 9.

As may be seen from FIGURES 1 and 2, the oil pump 10 consists of the two housing parts 12 and 13 which are secured at the eccentric 1 by means of bolts 14, and of the gear wheels 15 and 16 rotatably supported within the housing parts 12 and 13 and in meshing engagement with one another. The gear wheel 15 is non-rotatably connected with the driving gear wheel 17 disposed outside of the housing part 12 so as to rotate in unison therewith which, in turn, is in meshing engagement with the gear wheel 18 arranged concentrically to the eccentric shaft 2 and rigidly held at the housing of the engine.

During operation of the internal combustion engine when the eccentric shaft 2 rotates in the direction of arrow 19 (FIG. 2), the driving gear 17 and therewith the gear wheel 15 dependent thereon is rotated in the direction of arrow 20. The gear wheel 15 then, together with the gear wheel 16, draws or sucks oil out of the space 11 which enters into the oil pump 10 through the suction aperture 21 and 21a and is pressed out of the pressure space 22 of the oil pump 10 through the bore 23 into the discharge bore 24 arranged radially within the eccentric 1 and then into the axial bore 25 extending through the eccentric shaft 2.

In order that the oil on the side of the piston, on which no oil pump is provided, can also be sucked-off by means of the oil pump 10, several pipe lines, bores or ducts 26 distributed uniformly over the circumference are provided which extend in the axial direction through the piston 3 in proximity to the oil rings 8 and connect with one another the two spaces between the piston end walls and the lateral parts of the housing so that the accumulating oil can reach the space 11 through the lines 26 and thus can reach the suction aperture 21a or the suction apertures 21a and 21 of the oil pump 10. In order to facilitate guidance of the oil through the lines 26, the lines 26 are disposed obliquely in such a manner that the inlet apertures thereof scoop or intercept the oil favorably.

When the piston 3 is constructed in such a manner that the cooling oil is guided laterally out of the piston from the piston interior, the oil pump 10 may be advantageously so constructed that in addition to the lubricating oil, it sucks off also the cooling oil to be discharged and presses the same into the discharge bore.

While I have shown and described one embodiment in accordance with the present invention, it is understood that the same is not limited thereto, but is susceptible of numerous changes and modifications within the spirit and scope thereof, and I therefore do not wish to be limited to the details shown and described herein, but intend to cover all such changes and modifications as are intended by the scope of the appended claims.

I claim:

1. A rotary-piston internal combustion engine of trochoidal construction, comprising:

housing means provided with internal surface means and lateral housing parts, eccentric shaft means provided with eccentric means, polygonal piston means having radial and axial seal means and rotatably supported on said eccentric means, said piston means sliding with the radial seal means thereof arranged at the piston corners along the inner surface means and with the axial seal means thereof arranged at the end walls thereof, which include oil seal ring means, along the lateral parts, oil pump means constructed as gear pump and rigidly arranged at the end surface of the eccentric means at least on one side of the piston means between the piston end wall and the corresponding lateral housing part, a gear wheel rigidly secured to said housing means and disposed substantially concentrically to the eccentric shaft means, and drive means for driving said pump means including a further gear wheel in meshing engagement with said first-mentioned gear wheel, said oil pump means being operable to draw oil out of the spaces between a piston end wall and the corresponding lateral housing part within the area of the oil seal ring means and forcibly discharging the same into a discharge bore provided within said eccentric means and within said eccentric shaft means.

2. A rotary-piston internal combustion engine of trochoidal construction, comprising:

housing means provided with internal surface means and lateral housing parts, eccentric shaft means provided with eccentric means, polygonal piston means having radial and axial seal means and rotatably supported on said eccentric means, said piston means sliding with the radial seal means thereof arranged at the piston corners along the inner surface means and with the axial seal means thereof arranged at the end walls thereof, which include oil seal ring means, along the lateral parts, oil pump means constructed as gear pump and rigidly arranged at the end surface of the eccentric means at least on one side of the piston means between the piston end wall and the corresponding lateral housing part, a gear wheel rigidly secured to said housing means and disposed substantially concentrically to the eccentric shaft means, and drive means for driving said pump means including a further gear wheel in meshing engagement with said first-mentioned gear wheel, said oil pump means being operable to draw oil out of the spaces between a piston end wall and the corresponding lateral housing part within the area of the oil seal ring means and forcibly discharging the same into a discharge bore provided within said eccentric means and within said eccentric shaft means, and several conduits extending substantially in the axial direction of the piston means within proximity of the oil seal ring means which interconnect the space between the one piston end wall and the one lateral housing part with the space between the other piston end wall and the other lateral housing part.

3. A rotary-piston internal combustion engine of trochoidal construction, comprising:

housing means provided with internal surface means and lateral housing parts, eccentric shaft means provided with eccentric means, polygonal piston means having radial and axial seal means and rotatably supported on said eccentric means, said piston means sliding with the radial seal means thereof arranged at the piston corners along the inner surface means and with the axial seal means thereof arranged at the end walls thereof, which include oil seal ring means, along the lateral parts, oil pump means constructed as gear pump and rigidly arranged at the end surface of the eccentric means at least on one side of the piston means between the piston end wall and the corresponding lateral housing part, a gear wheel rigidly secured to said housing means and disposed substantially concentrically to the eccentric shaft means, and drive means for driving said pump means including a further gear wheel in meshing engagement with said first-mentioned gear wheel, said oil pump means being operable to draw oil out of the spaces between a piston end wall and the corresponding lateral housing part within the area of the oil seal ring means and forcibly discharging the same into a discharge bore provided within said eccentric means and within said eccentric shaft means, and several conduits extending substantially in the axial direction of the piston means within proximity of the oil seal ring means which interconnect the space between the one piston end wall and the one lateral housing part with the space between the other piston end wall and the other lateral housing part, said conduits being disposed inclined in the direction of rotation of the piston means.

4. A rotary-piston internal combustion engine of trochoidal construction, comprising:

housing means provided with internal surface means and lateral housing parts, eccentric shaft means provided with eccentric means, polygonal piston means having radial and axial seal means and rotatably supported on said eccentric means, said piston means sliding with the radial seal means thereof arranged at the piston corners along the inner surface means and with the axial seal means thereof arranged at the end walls thereof, which include oil seal ring means, along the lateral parts, oil pump means constructed as gear pump and rigidly arranged at the end surface of the eccentric means at least on one side of the piston means between the piston end wall and the corresponding lateral housing part, a gear wheel rigidly secured to said housing means and disposed substantially concentrically to the eccentric shaft means, and drive means for driving said pump means including a further gear wheel in meshing engagement with said first-mentioned gear wheel, said oil pump means being operable to draw oil out of the spaces between a piston end wall and the corresponding lateral housing part within the area of the oil seal ring means and forcibly discharging the same into a discharge bore provided within said eccentric means and within said eccentric shaft means, and several conduits extending substantially in the axial direction of the piston means within proximity of the oil seal ring means which interconnect the space between the one piston end wall and the one lateral housing part with the space between the other piston end wall and the other lateral housing part, said conduits being disposed inclined in the direction of rotation of the piston means, and a transmission for controlling the rotation of the piston means including a ring gear secured at the piston means and a pinion secured at the housing means and forming said first-mentioned gear wheel.

5. A rotary-piston internal combustion engine of trochoidal construction, comprising:

housing means provided with internal surface means and lateral housing parts, eccentric shaft means provided with eccentric means, polygonal piston means having radial and axial seal means and rotatably supported on said eccentric means, said piston means sliding with the radial seal means thereof arranged at the piston corners along the inner surface means and with the axial seal means thereof arranged at the end walls thereof, which include oil seal ring means, along the lateral parts, oil pump means constructed as gear pump and rigidly arranged at the end surface of the eccentric means at least on one side of the piston means between the piston end wall and the corresponding lateral housing part, a gear wheel rigidly secured to said housing means and disposed substantially concentrically to the eccentric shaft means, and drive means for driving said pump means including a further gear wheel in meshing engagement with said first-mentioned gear wheel.

said oil pump means being operable to draw oil out of the spaces between a piston end wall and the corresponding lateral housing part within the area of the oil seal ring means and forcibly discharging the same into a discharge bore provided within said eccentric means and within said eccentric shaft means, and a transmission for controlling the rotation of the piston means including a ring gear secured at the piston means and a pinion secured at the housing means and forming said first-mentioned gear wheel.

6. A rotary-piston internal combustion engine of trochoical construction, comprising:

housing means including lateral housing parts, polygonal piston means rotatable within said housing means and having axial seal means, said piston means sliding with the axial seal means arranged at the end walls thereof along the lateral parts, and oil pump means arranged at least on one side of the piston means between the piston end wall and the corresponding lateral housing part for relieving said axial seal means from relatively high hydraulic loads caused by oil seeking to leak radially outwardly past said axial seal means.

7. A rotary-piston internal combustion engine of trochoical construction, comprising:

housing means including lateral housing parts, polygonal piston means rotatable within said housing means and having axial seal means including sealing ring means, said piston means sliding with the axial seal means arranged at the end walls thereof along the lateral parts, and oil pump means constructed as gear pump arranged at least partly within and on one side of the piston means between the piston end wall and the corresponding lateral housing part for relieving said axial seal means from relatively high hydraulic loads caused by oil seeking to leak radially outwardly past said axial seal means.

8. In a rotary-piston internal combustion engine of trochoidal construction in which a polygonal piston is rotatably arranged on the eccentric of an eccentric shaft and in which the piston slides with the radial seals arranged at the corners thereof along the inner surfaces of a housing and with the axial seals, which include oil seal rings and are arranged at the end walls of the piston, along lateral housing parts, the improvement essentially consisting of an oil pump constructed as gear pump which is arranged rigidly at the end surface of the eccentric at least on one side of the piston between the piston end wall and the corresponding lateral housing part, a gear wheel for driving said oil pump, and a further gear wheel rigidly secured at the housing and concentrically arranged with respect to the eccentric shaft which meshes with said driving gear wheel, said oil pump being operable to suck oil out of the inside of the piston and out of at least one of the spaces between the piston end walls and the lateral housing parts within the area of the oil seal rings and pushing the oil into a discharge bore provided within the eccentric and the eccentric shaft.

9. In a rotary piston internal combustion engine of trochoidal construction in which a polygonal piston is rotatably arranged on the eccentric of an eccentric shaft and in which the piston slides with the radial seals arranged at the corners thereof along the inner surfaces of a housing and with the axial seals, which include oil seal rings and are arranged at the end walls of the piston, along lateral housing parts, the improvement essentially consisting of an oil pump constructed as gear pump which is arranged rigidly at the end surface of the eccentric at least on one side of the piston between the piston end wall and the corresponding lateral housing part, a gear wheel for driving said oil pump, and a further gear wheel rigidly secured at the housing and concentrically arranged with respect to the eccentric shaft which meshes with said driving gear wheel, said oil pump being operable to suck oil out of the inside of the piston and out of at least one of the spaces between the piston end walls and the lateral housing parts within the area of the oil seal rings and pushing the oil into a discharge bore provided within the eccentric and the eccentric shaft, a plurality of circumferentially distributed lines provided within the piston in proximity to the oil seal rings, said lines extending in the axial direction of the piston and interconnecting the space disposed between one piston end wall and one lateral housing part with the space disposed between the other piston end wall and the other lateral housing part.

10. In a rotary-piston internal combustion engine of trochoidal construction in which a polygonal piston is rotatably arranged on the eccentric of an eccentric shaft and in which the piston slides with the radial seals arranged at the corners thereof along the inner surfaces of a housing and with the axial seals, which include oil seal rings and are arranged at the end walls of the piston, along lateral housing parts,
the improvement essentially consisting of an oil pump constructed as gear pump which is arranged rigidly at the end surface of the eccentric at least on one side of the piston between the piston end wall and the corresponding lateral housing part,
a gear wheel for driving said oil pump,
and a further gear wheel rigidly secured at the housing and concentrically arranged with respect to the eccentric shaft which meshes with said driving gear wheel,
said oil pump being operable to suck oil out of the inside of the piston and out of at least one of the spaces between the piston end walls and the lateral housing parts within the area of the oil seal rings and pushing the oil into a discharge bore provided within the eccentric and the eccentric shaft,
a plurality of circumferentially distributed lines provided within the piston in proximity to the oil seal rings, said lines extending in the axial direction of the piston and interconnecting the space disposed between one piston end wall and one lateral housing part with the space disposed between the other piston end wall and the other lateral housing part,
said lines being disposed at an angle to an axial plane passing through the axis of the eccentric shaft.

No references cited.

MARK M. NEWMAN, *Primary Examiner.*

F. T. SADLER, *Assistant Examiner.*